Figure 3:
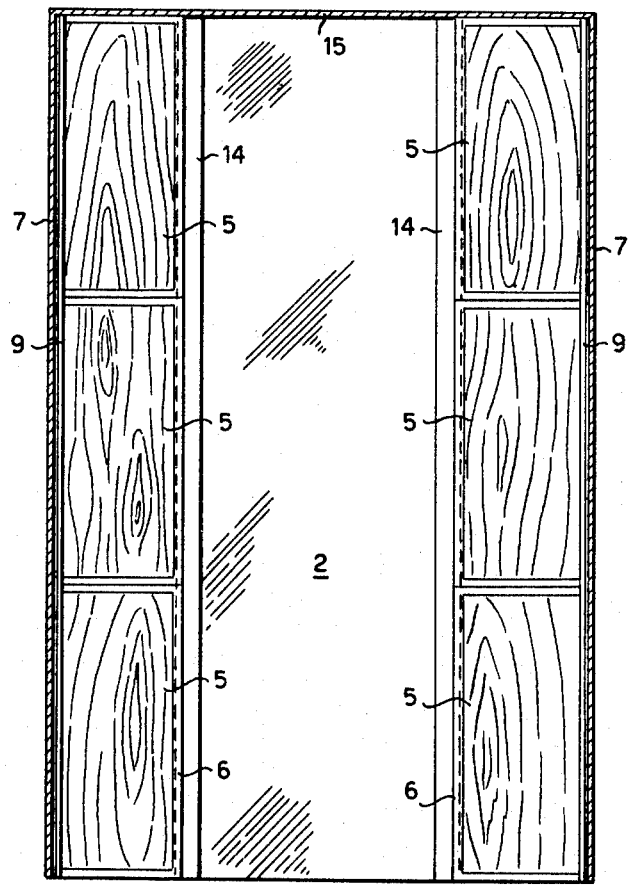

Jan. 3, 1956  H. J. VAN DOORNE ET AL  2,729,501
VEHICLE CONVERTIBLE FOR CARRYING MEN OR GOODS
Filed April 14, 1952  4 Sheets-Sheet 1
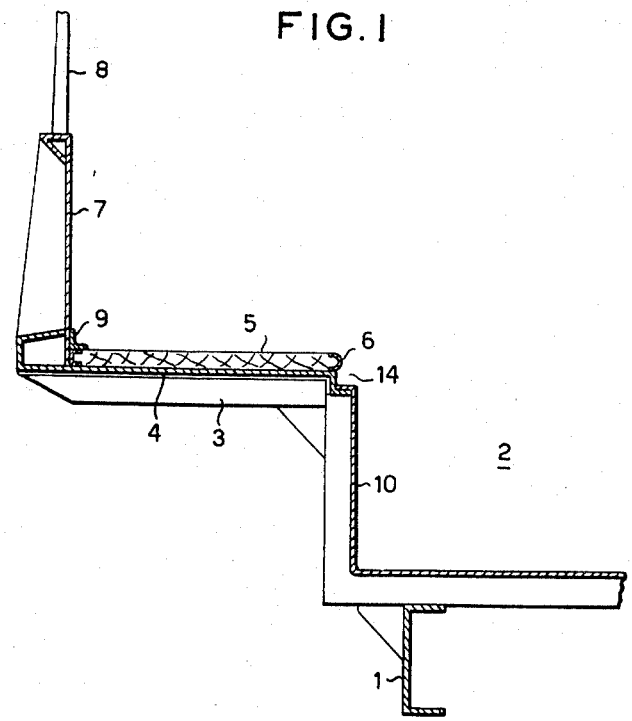
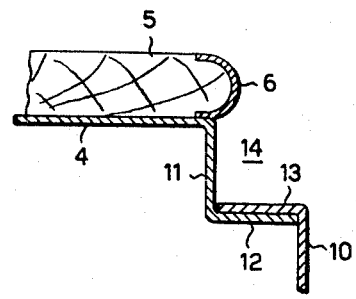

Jan. 3, 1956   H. J. VAN DOORNE ET AL   2,729,501
VEHICLE CONVERTIBLE FOR CARRYING MEN OR GOODS
Filed April 14, 1952   4 Sheets-Sheet 2

INVENTORS
Hubertus Josephus Van Doorne
Johannes Jacobus Pop

BY Henderoth, Lind + Ponack
ATTORNEYS

INVENTORS.
Hubertus Josephus Van Doorne
Johannes Jacobus Pop

BY Menderoth, Lind & Ponack
ATTORNEYS.

Jan. 3, 1956  H. J. VAN DOORNE ET AL  2,729,501
VEHICLE CONVERTIBLE FOR CARRYING MEN OR GOODS
Filed April 14, 1952  4 Sheets-Sheet 4

INVENTORS
Hubertus Josephus Van Doorne
Johannes Jacobus Pop
BY Henderoth, Lind + Ponack
ATTORNEYS

United States Patent Office 2,729,501
Patented Jan. 3, 1956

2,729,501

VEHICLE CONVERTIBLE FOR CARRYING MEN OR GOODS

Hubertus Josephus van Doorne, Deurne, and Johannes Jacobus Pop, The Hague, Netherlands Application April 14, 1952, Serial No. 282,106

Claims priority, application Netherlands April 21, 1951

4 Claims. (Cl. 296—66)

The invention relates to a troop or personnel carrying vehicle having longitudinal benches at both sides of a central foot space.

Circumstances may occur that it is desired to adapt a vehicle of this kind, e. g. a motor vehicle, a trailer or a semi-trailer, to the transport of goods, but often in such a case the foot space will be too narrow to place bulky objects therein.

A purpose of the invention is to provide a vehicle of the kind described hereabove which is adapted to be transformed from a men carrying vehicle to a goods carrying vehicle in a simple and speedy way.

Another purpose of the invention is to provide a vehicle of the described kind which is adapted to be simply and qiuckly transformed into a vehicle for mixed transport, for example into a vehicle for transporting men and goods at the same time.

Still another purpose of the invention is to provide a vehicle of the described kind which is adapted to be simply and quickly transformed into a vehicle for carrying bulky objects on a large loading floor and at the same time smaller goods in the foot space below said loading floor.

Still another purpose of the invention is to provide a vehicle of the above described kind which is adapted to be simply and quickly transformed into a goods carrying vehicle in which the foot space is free from obstructions so that the entire foot space below a removable loading floor is available for stowage of goods.

Still another purpose of the invention is to provide a vehicle of the above described kind which is adapted to be gradually loaded above and below a loading floor according as seating planks are laid in cross direction one by one in order to cover the foot space.

Another purpose of the invention is to provide a vehicle of the described kind which in emergency cases is adapted to transport at least six wounded men lying on stretchers and at the same time several seating wounded or ambulance men.

Still another purpose of the invention is to provide a vehicle of the described kind in which seating planks lying on the longitudinal benches are adapted to be laid in cross direction over the foot space such that a continuous loading floor is obtained which extends over about the entire interior width of the vehicle body.

The invention fulfils the above purposes and thereby provides a vehicle which has important advantages for a troop carrier for military use but also for a personnel carrying vehicle for the police or for the fire-brigade, for vehicles for workmen of builders and contractors, and also for smaller vehicles, for example of the well-known type Jeep.

Other purposes, advantages and characteristics of the invention will follow from the description of an embodiment.

Figure 4:
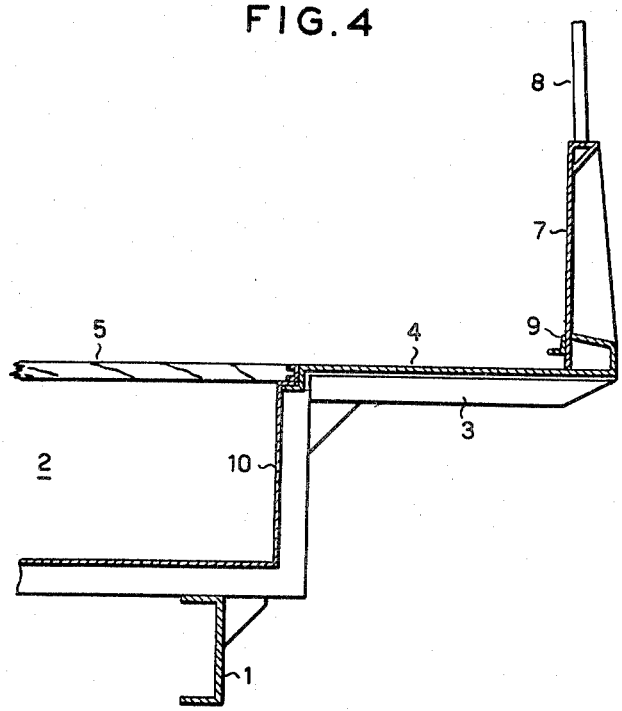
Figure 5:
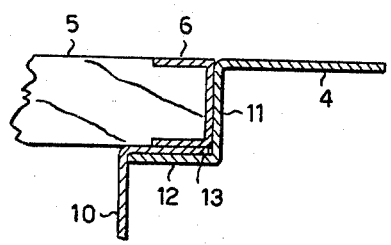
Figure 6:
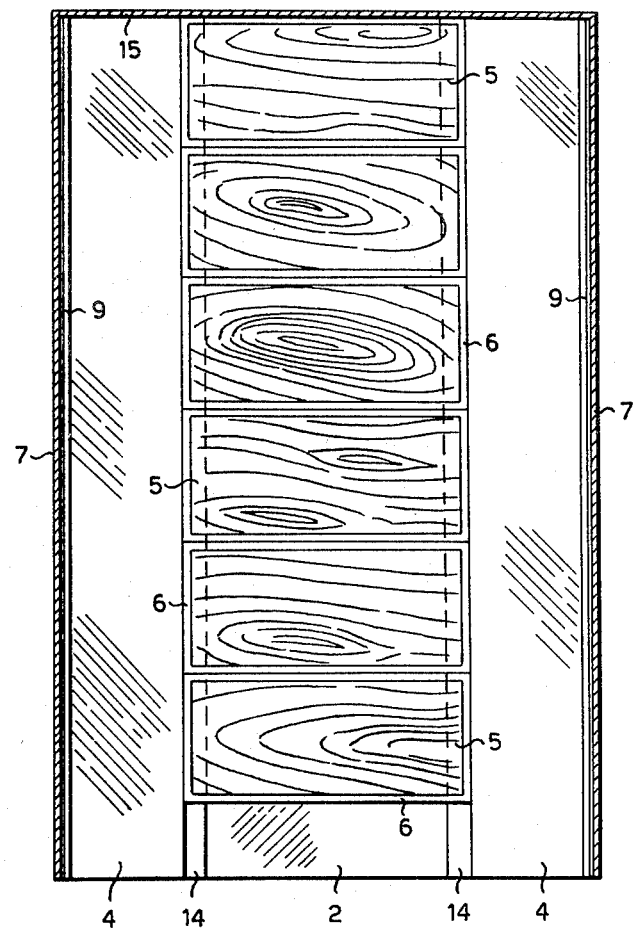

In order to elucidate the invention reference is made to the accompanying schematical drawings in which:

Fig. 1 is a cross section of a part of the left half of the body of a vehicle, for example a troop carrier, according to the invention, in the condition for carrying men, Fig. 2 is a detail of Fig. 1 on a larger scale, Fig. 3 is a plan view of the vehicle body in the condition for carrying men, Fig. 4 is a cross section of the vehicle body shown in Fig. 1, but of the right half and in the condition for carrying goods, Fig. 5 is a detail of Fig. 4 on a larger scale, and Fig. 6 is a plan view corresponding with Fig. 3, but in the condition for carrying goods.

A body adapted for carrying men is fixed on a frame, the longitudinal beams 1 of which are illustrated in cross section. At both sides of a foot space 2 longitudinal benches are formed by raised platforms 4 which are carried by beams 3 of the body structure, said platforms being made of sheet metal. Seating planks 5 rest on said platforms 4 (vide Figs. 1 to 3), the edges of said seating planks being protected by a profiled frame 6. The back of said benches is formed by side-walls 7 provided with square tubes in which arches 8 are inserted for carrying a hood. Angle irons 9 are fixed to the side-walls 7 at some distance above the platforms 4 so that the seating planks 5 may be inserted below said angle irons.

A foot space 2 has a floor forming one piece with side-walls 10 which are connected to the sheets forming the platforms 4 in the following way. Each sheet has at its inner edge a downward bent portion 11 which joins a horizontal portion 12. This horizontal portion 12 is covered by an outward bent upper edge 13 of the wall 10, said horizontal portions 12 and 13 being welded together or fixed in any other manner. In this way an L-shaped recess 14 is formed, the height of which is equal to the thickness of the seating planks 5.

In Figs. 1 to 3 the seating planks 5 are illustrated in the position adapted for carrying men. If it is desired to use the vehicle for carrying goods of large dimensions, the seating planks 5 are removed from the platforms 4 and laid in cross direction in the recesses 14 as shown in Figs. 4 to 6. The length of the seating planks is such that when they rest in the recesses 14, they fit between the vertical portions 11 of the recesses.

The upperside of the planks 5 when used as benches can be provided with a leather covering, not shown in the drawings. It is evident that if the planks are to be used for forming the intermediate part of a loading floor, the planks have to be turned upside down so that the leather covering is at the underside.

In a troop carrier for which the above described body is designed, the platforms 4 form the upperside of wheel cases which extend along the whole length of the body up to the rear wall 15 of the not shown cab. As a mere example it may be assumed that the distance between the vertical portions 11 of the recesses 14 is 44 inches so that the length of the planks is also 44 inches, the width of the platforms 4 between the recess 14 and the sidewall 7 is 19.5 inches and the width of the planks 5 is 20 inches. If on each platform 4, three planks are laid end to end, six planks are available to be laid one behind the other in the recesses 14 so that a loading floor is obtained of 120 inches (in longitudinal direction of the vehicle) by 83 inches (in cross direction). However, it is clear that the invention is not restricted to any of these dimensions.

Further it will be clear that in accordance with a desired use for mixed transport of goods and men any number of the planks may be laid in cross direction, the remaining planks being adapted to be used as seats. In emergency cases the vehicle according to the invention may be used for carrying wounded men lying on stretchers, four stretchers being placed side by side on the platforms 4 and four of the planks 5, and two stretchers being placed in the foot space 2 below the planks, however with the heads of the wounded beyond the rear edge of the fourth plank. Two of the planks remain on the rear parts of the platforms 4 so that there is still room left for seated wounded or for ambulance men.

It is remarked that the drawings are only schematical, the cab in front of the wall 15, the uprights for supporting the side-walls 7 and the usual hinged rear flap, etc. being omitted.

Having now described and ascertained the invention, what is claimed is:

1. In a troop or personnel carrying vehicle: a body having a floor, two longitudinal side-walls, a foot space above said floor and between said side-walls, two longitudinal platforms seating planks adapted to cover said platforms, a rectangular step having a vertical and a horizontal portion between each of said platforms and the adjacent side-wall of said foot space, the length of said seating planks being substantially equal to the distance between the vertical portions of said steps and the thickness of said seating planks being substantially equal to the height of said steps.

2. In a troop or personnel carrying vehicle: two longitudinal benches, a plurality of seating planks adapted to cover each of said benches, a foot space between said benches, sheet metal side-walls of said foot space having at their upper edges horizontal outward bent portions, said benches being composed of horizontal sheet metal platforms having at their inner edges vertical downward bent portions which together with the horizontal outward bent portions of said side-walls form L-shaped recesses of a depth substantially equal to the thickness of said seating planks, the distance between said vertical portions being substantially equal to the length of said seating planks.

3. In a troop or personnel carrying vehicle, a body having a floor, two vertical longitudinal side-walls adjoining said floor, rectangular steps extending along the upper edges of said side-walls each step having a horizontal and a vertical plane, two longitudinal platforms, each of which adjoining the vertical plane of the adjacent step and a plurality of seating planks adapted to cover said platforms, the length of said seating planks being substantially equal to the distance between the vertical planes of said steps and the thickness of said seating planks being substantially equal to the height of said steps.

4. In a troop or personnel carrying vehicle, a body having a floor, two vertical longitudinal side-walls adjoining said floor, rectangular steps extending along the upper edges of said side-walls, each step having a horizontal and a vertical plane, two longitudinal platforms, each of which adjoins the vertical plane of the adjacent step, a plurality of seating planks adapted to cover said platforms, two sides projecting upwardly from the edges of said platforms opposite the steps, seating plank retaining members protruding over said platforms from said sides a distance above said platforms equal to the thickness of said planks, the length of said seating planks being substantially equal to the distance between the vertical planes of said steps and the thickness of said seating planks being substantially equal to the height of said steps.

References Cited in the file of this patent

UNITED STATES PATENTS

| | | |
|---|---|---|
| 323,973 | Teets | Aug. 11, 1885 |
| 1,208,261 | Wood | Dec. 12, 1916 |
| 1,480,247 | Dove | Jan. 8, 1924 |
| 2,086,091 | Payette | July 6, 1937 |

FOREIGN PATENTS

| | | |
|---|---|---|
| 45,124 | Norway | Apr. 30, 1928 |